W. E. RICHARDSON.
Meat Cutter.
No. 46,942.　　　　　　　　　　　Patented March 21, 1865.
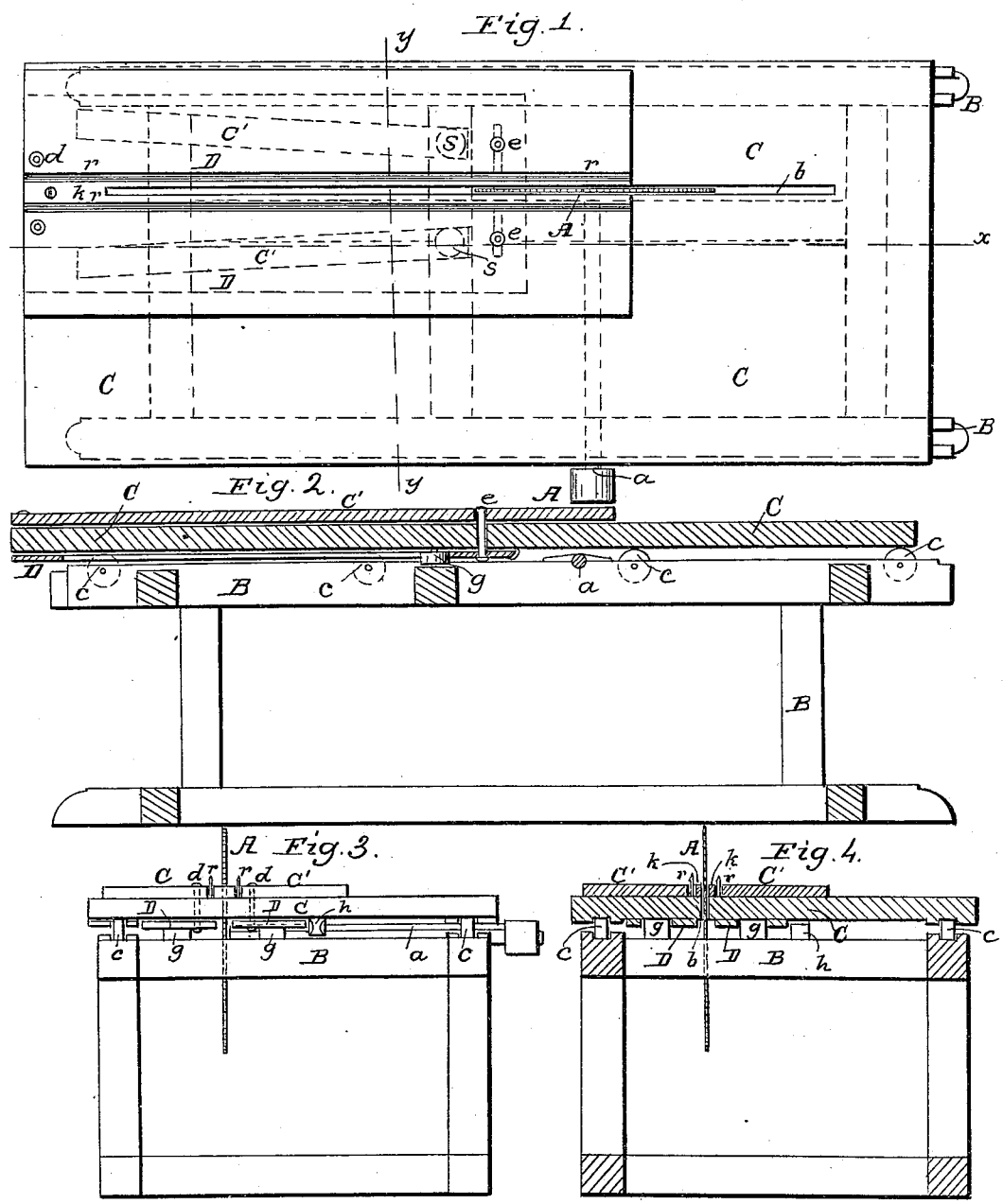

UNITED STATES PATENT OFFICE.

WILLIAM E. RICHARDSON, OF CHICAGO, ILLINOIS.

MACHINE FOR CUTTING MEAT.

Specification forming part of Letters Patent No. 46,942, dated March 21, 1865.

*To all whom it may concern:*

Be it known that I, W. E. RICHARDSON, of Chicago, Cook county, State of Illinois, have invented a new and useful Machine for Cutting Meat; and I do hereby declare that the following is a full, clear, and exact description thereof, reference being had to the accompanying drawings, making a part of this specification, in which—

Figure 1 is a plan view of a machine which is adapted for cutting meat. Fig. 2 is a longitudinal section taken in a vertical plane through Fig. 1, and indicated by red line $x\ x$. Fig. 3 is an elevation of one end of the machine. Fig. 4 is a transverse section taken at the point indicated by red line $y\ y$, Fig. 1.

Similar letters of reference indicate corresponding parts in the several figures.

The object of my invention is to practically employ circular saws in the operation of cutting meat into pieces suitable for packing away for the market, thus enabling this character of work, which hitherto required the expenditure of great manual labor, to be performed by machinery driven by steam or other power.

To this end the nature of my invention consists in the employment of one or more circular saws in combination with contrivances which will spread the meat during the operation of cutting it, and thus allow the saw to work freely and with as little friction as possible, as will be hereinafter described.

To enable others skilled in the art to make and use my invention, I will describe its construction and operation.

In the accompanying drawings, A represents a circular saw. The carriage C consists of a horizontal board which is slotted longitudinally at $b$ to receive the saw, and which is mounted upon friction-rollers $c\ c\ c$, that project up from and have their bearings on the two uppermost longitudinal rails of the frame B, as shown in Figs. 2, 3, and 4.

The slot $b$ through the carriage should be of such length as to allow this carriage to be moved backward and forward the required distance to cut through the largest pieces of meat placed upon it, and the friction-rollers $c\ c$, upon which said carriage is supported, should work in longitudinal grooves cut into the bottom of the carriage, for the purpose of preventing the latter from side or lateral displacement when it is moved back and forth in a direction with the cut of the saw A.

$C'\ C'$ represent two boards of the required width and length to receive upon them the meat to be cut up. These boards are arranged at one end of the carriage C and on each side of the longitudinal slot $b$ through which the saw passes, as shown in Figs. 1, 3, and 4. These two boards $C'\ C'$ are pivoted at $d\ d$ to the carriage C by means of vertical pins, which also form pivotal connections for two obliquely-slotted strips, D D, which are arranged beneath the carriage C, as shown in Figs. 2, 3, and 4. These strips D D are again connected to their respective boards $C'\ C'$, on top of the carriage, by means of vertical pins $e\ e$, which pass through curved slots, as indicated in dotted lines, Fig. 1, which are made through the carriage. Thus it will be seen that when the two slotted strips D D are separated at their free ends the boards $C'\ C'$ will be moved apart at their free ends a corresponding distance. To effect this separation of the boards $C'\ C'$ and D D automatically, I employ two rollers, $g\ g$, which are located upon an upper transverse bar of frame B near the saw, as shown in the drawings, and which receive the slotted strips D D when the carriage C is in position for operation. The forward movement of the carriage C can be regulated by the stop-blocks $h\ h$, which will prevent this carriage from being casually cut by the saw.

Between the two boards $C'\ C'$ is inserted a slotted strip, $k$, which is intended to support the meat or article being cut at the point of cut, to prevent it from being lacerated and portions dragged down by the saw-teeth between the face of the saw and the slot in the carriage.

In order to prevent the boards $C'\ C'$ from slipping laterally from beneath the meat during their opening movement, sharp ridges $r\ r$, or spurs or other equivalent contrivances, are applied to these boards $C'\ C'$, as shown in Figs. 1 and 3, which cause the divided portions of the meat to spread apart immediately on being cut and during the operation of cutting or sawing, and by this means the meat will only be brought into contact with the teeth of the saw, and not with its sides.

I have found by experiment that meat cannot be cut with a circular saw practically unless some contrivance is adopted for spreading the meat and preventing it from contact with the sides of the saw during the operation of cutting. The great friction which is occasioned on the saw by meat pressing against its sides renders the use of spreading contrivances necessary to effect the object rapidly and completely; and while I have described one contrivance which will answer the desired end I do not mean to be understood as confining my invention to its mechanical detail, but reserve the right to employ other contrivances in combination with circular saws which will operate substantially in a like manner and produce the same result.

Having thus described my invention, what I claim as new, and desire to secure by Letters Patent, is—

The employment of a circular saw for cutting meat, or other like substances, in combination with contrivances for spreading said substance during the operation of sawing and keeping its surfaces from forcible contact with the sides of the saw, substantially as described.

WILLIAM E. RICHARDSON.

Witnesses:
JAS. M. SHERMAN,
JAS. R. GRANGER.